March 20, 1956

C. B. STEVENSON ET AL 2,738,545

MACHINE FOR SKINNING FISH

Filed Nov. 18, 1952

CHARLES B. STEVENSON
JOHN A. HODGES
INVENTORS

BY Lyon & Lyon

ATTORNEYS

March 20, 1956  C. B. STEVENSON ET AL  2,738,545
MACHINE FOR SKINNING FISH
Filed Nov. 18, 1952  3 Sheets-Sheet 2
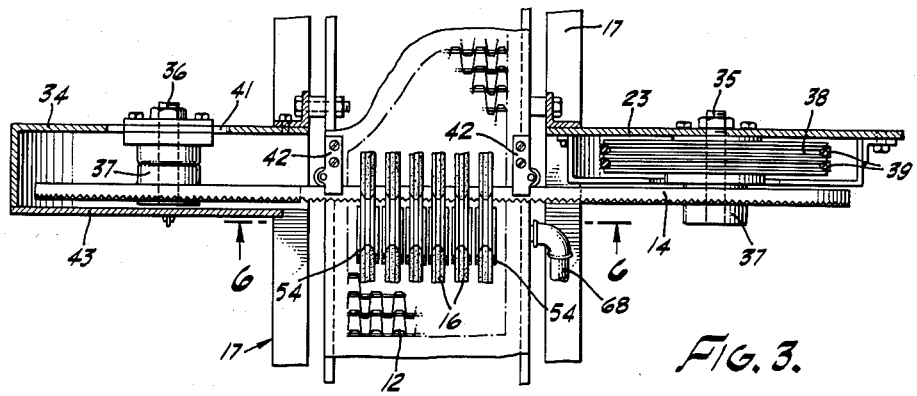
FIG. 3.
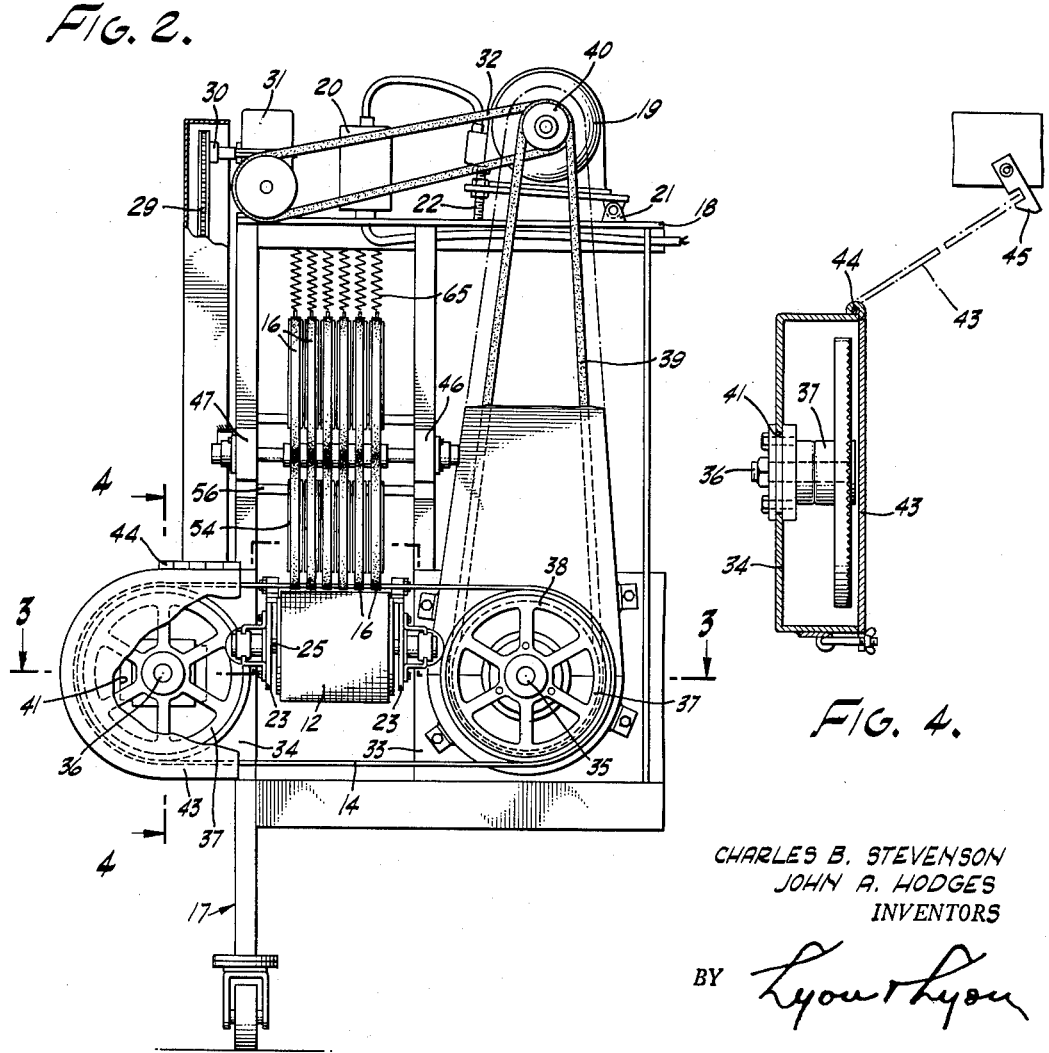
FIG. 2.
FIG. 4.
CHARLES B. STEVENSON
JOHN A. HODGES
INVENTORS
BY Lyon & Lyon
ATTORNEYS

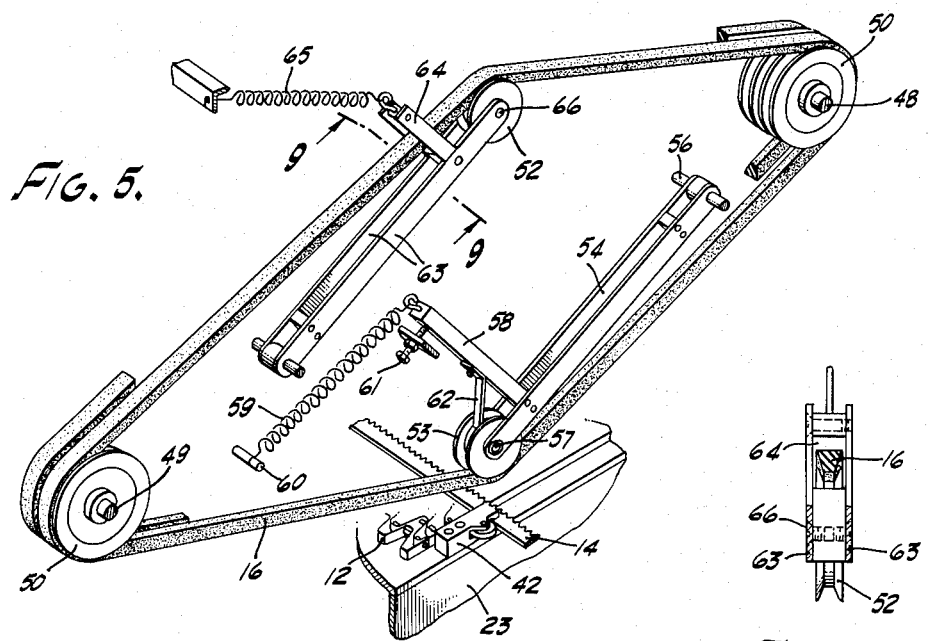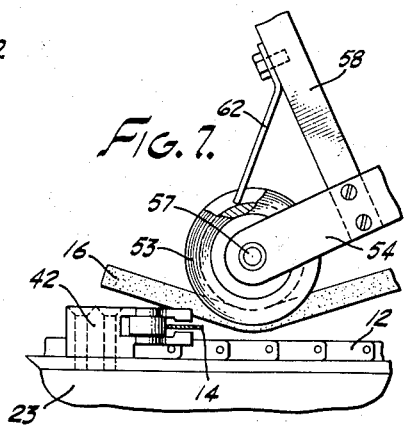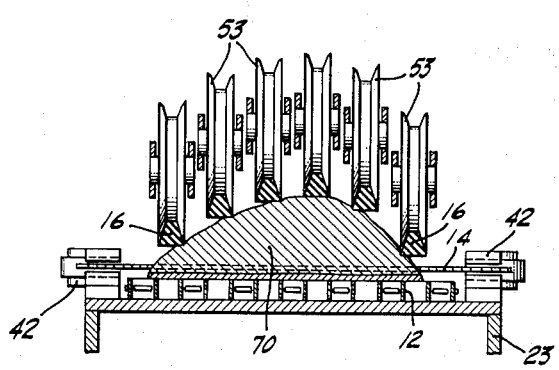

United States Patent Office 2,738,545
Patented Mar. 20, 1956

2,738,545
MACHINE FOR SKINNING FISH

Charles B. Stevenson, Wilmington, and John A. Hodges, Long Beach, Calif., assignors to Harold R. Pauley, Los Angeles, Calif.

Application November 18, 1952, Serial No. 321,069

5 Claims. (Cl. 17—4)

This invention relates to machines for skinning fish, particularly fish of the larger size, such for example, as those of the tuna type.

Several types of machines have been designed for skinning fish. In such machines the bones of the fish are normally removed and the fish is cut into convenient size portions and placed skin side down upon a traveling conveyor belt. A knife spaced above the belt is employed to sever the meat portion from the skin. The principal problem encountered in machines of this type is that of holding the article firmly and uniformly on the traveling belt so that the cutting mechanism efficiently removes the skin without also cutting out substantial portions of the meat. Several expedients have been proposed for properly maintaining the fish portions against the traveling belt but the problem is made difficult by the non-uniform contour of the fish, particularly where relatively large portions of fish are encountered.

The above noted difficulties are increased as the size of the fish or of the pieces of fish is increased. Consequently, skinning of larger types of fish, such as for example, fish of the tuna type, is generally still done by hand.

In accordance with the present invention a skinning machine is provided which overcomes these disadvantages.

It is an object of this invention to provide a fish skinning machine which will operate continuously and at high speeds.

It is a further object of this invention to provide such a machine which is inexpensive to construct and maintain.

It is a further object of this invention to provide such a machine which will operate efficiently with relatively large pieces of fish.

In the drawings:

Fig. 2 is a section taken along the line 2—2 of Fig. 1;

Fig. 3 is an enlarged section taken along the line 3—3 of Fig. 2;

Fig. 4 is an enlarged section taken along the line 4—4 of Fig. 2;

Fig. 5 is a perspective view of a portion of the machine;

Fig. 6 is an enlarged section taken along the line 6—6 of Fig. 3;

Fig. 7 is a section taken along the line 7—7 of Fig. 6;

Fig. 8 is a view similar to Fig. 6 illustrating the operation of the machine;

Fig. 9 is an enlarged section taken along the line 9—9 of Fig. 5; and

In general, the machine comprises a longitudinally extending endless conveyor belt 12, a transverse endless saw blade 14, the lower run of which is spaced above the conveyor belt 12 a distance equal to the desired thickness of cut to remove the skin from a piece of fish. The fish is carried, skin side down, by the conveyor belt 12 into engagement with the blade 14. To maintain the skin side of the fish flatly and uniformly upon the conveyor belt 12, a plurality of hold-down belts 16 are employed. Each of these belts is arranged to exert pressure upon the upper side of the fish. Moreover, each of the plurality of belts 16 is independently yieldable so as to conform to the varying contour of the fish. By thus yieldably biasing each hold-down belt toward the conveyor, regardless of the shape of the piece of fish being skinned, the skin side will be held flatly and uniformly against the conveyor belt 12 so that the saw blade 14 will uniformly remove the skin. In addition, and as an important feature of the invention, both the hold-down belts 16 and the conveyor belt 12 are driven, the former being driven at a slightly greater speed than the latter. For example, successful operation has been obtained when the conveyor belt is driven at about 37 feet per minute and the hold-down belts are driven at about 37.1 feet per minute. This slight difference in belt speeds prevents the fish from riding up over the saw blade, thereby eliminating one of the principal difficulties heretofore encountered in skinning machines of the type above described.

The ratio of the speed of the hold-down belts to the speed of the conveyor in the foregoing example is about 1.003 to 1. It will be understood that this ratio may be varied within reasonable limits without departing from the principles of the invention providing, of course, that the speed of the hold-down belts is sufficiently greater than that of the conveyor to urge the fish downwardly on the conveyor and thereby prevent the fish from riding up over the saw blade. It will also be understood that the ratio of hold-down belt speed to conveyor belt speed may be subject to variation when conveying speeds other than that of the example are utilized. Such variations, however, are intended to be within the scope of the expression "in the order of about 1.003 to 1" as hereinafter used.

Figure 1:
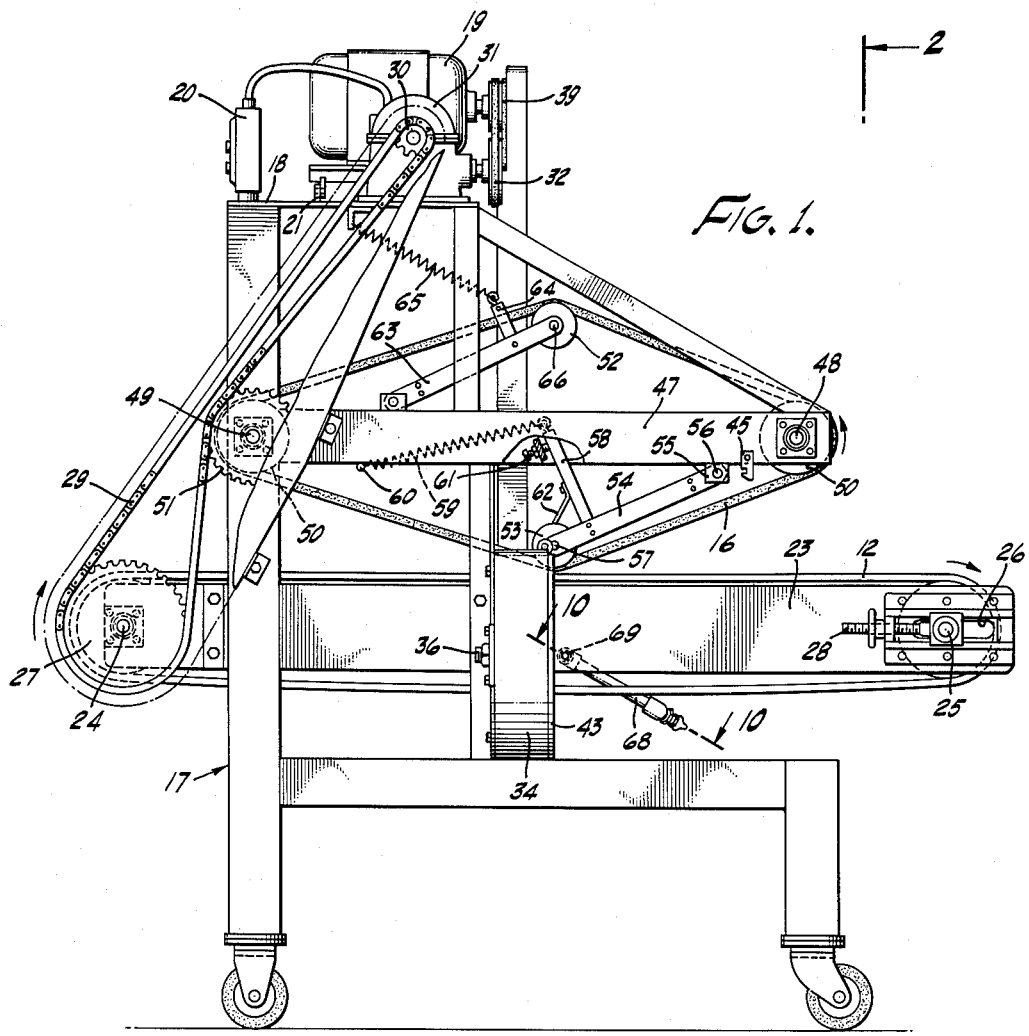
Figure 1 is a side elevation of a machine constructed in accordance with the present invention.

Referring now to the drawings wherein for purposes of illustration a preferred embodiment of the invention is shown, the machine is seen to consist of the frame, generally designated as 17, which, for convenience, may be supported by rollers, as shown. Portions of the machine hereinafter described are carried by the frame. Supported by a plate 18 at the top of the frame is the power unit 19 which is utilized to drive the different moving parts of the machine. Power is supplied to the power unit 19 through a switch 20. The power unit 19 is preferably mounted upon the plate 18 by means of a pivot bracket 21 and an adjustable length bolt 22, as seen in Fig. 2. This mounting permits ready adjustment of the tension of several drives associated with the power unit 19. A pair of spaced longitudinal support plates 23 are supported by the frame 17, being secured thereto as by bolts and brackets, as seen in Fig. 1. At each end of the support plates 23 carried by suitable bearings are shafts 24 and 25. These shafts carry cylindrical rollers which in turn carry the conveyor belt 12 which is preferably of the chain type. Shaft 25 is mounted, by means of suitable bearings, in slots 26 in the support plates 23. An adjustable length bolt 28 is provided so as to make possible adjustment of the tension on the conveyor belt 12. Meshed with a sprocket 27, carried by shaft 24 is an endless chain 29 which is meshed with a second sprocket 30. Sprocket 30 is driven through a gear box 31 by the power unit 19 through a belt 32. Direction of rotation is such that the conveyor belt 12 travels in the direction indicated by the arrows in Fig. 1.

As best seen in Figs. 2 and 3, a pair of supporting plates 33 and 34 are provided which are carried by the frame 17. These supporting plates 33 and 34 carry shafts 35 and 36 respectively, which are mounted in suitable bearings. Each of these shafts carries a wheel 37. These wheels 37 are employed to carry the endless saw blade 14. As seen, the wheels 37 are so disposed that the upper portion of the endless saw blade 14 lies just above the upper portion of the endless conveyor belt 12 whereas the lower portion of the endless saw blade 14 lies below the lower portion of the endless conveyor belt 12. Saw blade 14 is driven by power unit 19 through a sheave 38, carried by shaft 35, the belt assembly 39, and a sheave 40. While the speed of the saw blade is not critical, satisfactory performance has been obtained employing a blade speed on the order of 2,100 feet per minute. Roller guides 42 are provided at each side of and extending above the endless conveyor belt 12 to guide the endless saw blade 14. Shaft 36 is preferably mounted in a slot 41, as best seen in Fig. 3, to permit regulation of the tension of the endless saw blades 14. In addition, for protection of operating personnel, a cover 43 is employed. This cover is pivotally attached as at 44 shown in Fig. 4. A latch 45 carried by a frame member is utilized to hold the cover 43 in the open position for maintenance and inspection purposes.

The hold-down mechanism for maintaining the skin side of the fish flatly upon the endless conveyor belt 12 will now be described. A pair of spaced longitudinal bars 46 and 47, carried by suitable frame members are provided, in the end portions of which are journaled a pair of shafts 48 and 49. Each of these shafts carries a plurality of sheaves 50, said sheaves being spaced closely adjacent each other. The sheaves 50 carry a plurality of hold-down belts 16. Also carried by shaft 49 is a sprocket 51 which is meshed with chain 29, which as above described, is driven by power unit 19 through the gear box 31. The diameters of the sprockets 28 and 51 are such that hold-down belts 16 are driven at a speed which is slightly greater than that of the conveyor 12.

For each of the hol-down belts 16 an upper idler 52 and a lower idler 53 are employed. As will now be described, the lower idler 53 is spring loaded so as to cause each hold-down belt 16 to bear downwardly against the top portion of fish carried by the endless conveyor belt 12. That is, each hold-down belt is yieldably biased toward the conveyor belt. Thus, referring first to the lower idler 53, and as best seen in Figs. 1 and 5, a pair of spaced arms 54 are pivotally carried by the bars 46 and 47 by means of a bracket 55 which carries a shaft 56. The other end of the arms 54 carry a shaft 57 which is journaled in pulley 53. Rigidly attached to the arms 54 is an arm 58, at the end of which is attached a spring 59. The spring 59 is also attached to a pin 60 which is connected to the bar 47. The spring 59 is under tension, thereby tending to force the lower idler 53 downwardly. This causes the hold-down belts 16 to bear downwardly toward the conveyor belt 12. In order to prevent the hold-down belts 16 from being forced downwardly into the saw blade 14, a stop 61 is provided. A small wiper arm 62 is carried by arm 58 and acts to clean the lower idler 53.

The upper idlers 52 tend to maintain the proper tension on the hold-down belts 16. Thus, upper idler 52 is carried by a pair of arms 63 which are pivotally carried by the bar 47 in the same manner of the arms 54. Rigidly attached to the arms 63 are a pair of upwardly extending arms 64, one end of which is connected to a spring 65. The spring 65 is also attached to the frame, as best seen in Fig. 5. The upper idlers 52 are carried at the end of the arms 63 by suitable shafts 66. The spring 65 is kept under tension with the result that the upper idler 52 will take up any slack in the hold-down belts 16.

Figure 10:
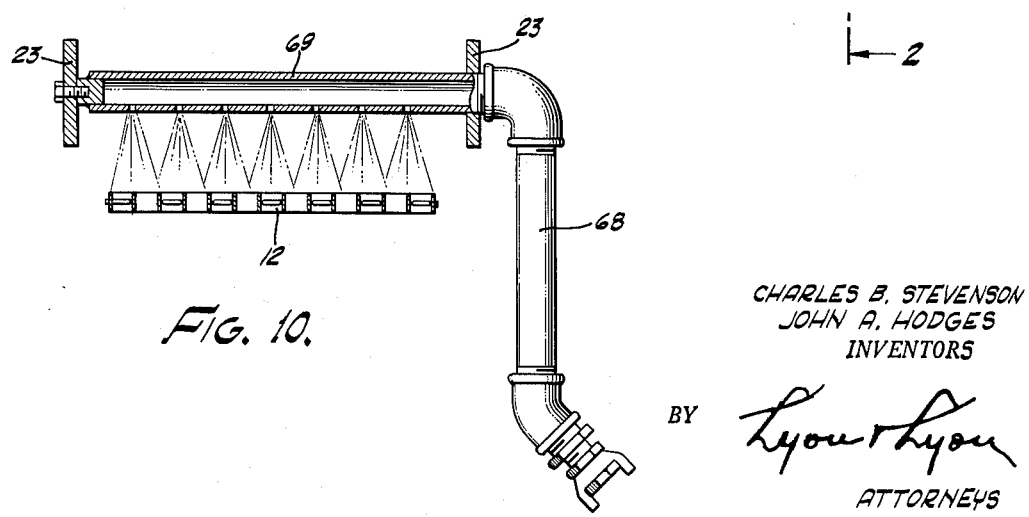
Fig. 10 is an enlarged section taken along the line 10—10 of Fig. 1.

It has been found preferable for continuous operation to constantly clean the conveyor belt 12. This is accomplished by means of a spraying mechanism. The mechanism is best seen in Fig. 10 and consists mainly of a feed pipe 68 which delivers cleaning water to a transversely extending pipe 69 which is disposed above the conveyor belt 12. A series of small openings in the lower side of the pipe 69 permit the cleaning water to fall upon the conveyor belt 12.

The operation of the machine will now be described. A fish, which as previously been eviscerated, deheaded and boned, is cut either into halves, quarters, or if desired, smaller sections. The pieces of fish are placed, skin side down, upon the conveyor belt 12. The conveyor belt 12 carries the pieces of fish into engagement with the endless saw blade 14, the upper portion of which is spaced above the conveyor belt 12 a sufficient distance to just cut the meat away from the skin. Just prior to reaching the endless saw blade 14 the upper portion of the fish section is engaged by the hold-down belts 16. The downward pressure of the hold-down belts 16 resulting from the spring loading thereof by the spring 59 holds the piece of fish firmly and uniformly against the conveyor belt 12, with the result that the skin side of the fish lies flatly upon the conveyor belt 12, making possible a uniform cut of the meat from the skin. By employing the plurality of independently spring loaded hold-down belts 16, a uniform cut is made regardless of the contour of the portion of fish. This is particularly important where large pieces of fish which have an irregular contour are encountered. Referring first to Fig. 6, it is seen that the hold-down belts 16 are uniformly disposed above the endless conveyor belt 12 until the portion of fish is encountered. When, as seen in Fig. 8, the portion of fish 70 is delivered by the endless conveyor belt 12, each of the hold-down belts 16, readily adjusts to the contour of the portion of fish 70 to provide a uniform downward pressure on the portion of fish 70 regardless of its irregular thickness. Moreover, as above described, by operating the hold-down belts 16 at a slightly higher speed than the endless conveyor belts 12, the forward portion of the piece of fish 70 is forced downwardly, thereby preventing the fish from riding up over the endless saw blade 14. The result of these two actions is to make possible high speed and uniform operation, regardless of the size and contour of the sections of fish encountered.

It is understood that the form of the invention herewith shown and described is to be taken as a preferred example of the same, and that various changes in the shape, size and arrangement of parts may be resorted to without departing from the spirit of the invention or the scope of the following claims.

We claim:

1. In a fish skinning machine, a driven longitudinally extending endless conveyor belt upon which fish portions to be skinned are placed, an endless band saw, a portion of which extends transversely of and slightly above said conveyor belt said saw being adapted to sever the skin from the meat of fish portions carried by said conveyor belt past said saw, a plurality of longitudinally extending endless hold-down belts disposed above said portion of the band saw and adapted to hold said fish portions uniformly upon said conveyor belt, a like plurality of idler pulleys bearing against the lower portion of each hold-down belt, an arm connected to each idler pulley, a spring connected to each arm and yieldably biasing said hold-down belt toward said conveyor, a stop associated with each said arm and limiting the downward movement of each hold-down belt, and means for driving said conveyor belt and said hold-down belts, said means driving said hold-down belts at a speed slightly greater than the speed of the conveyor belt.

2. In a fish skinning machine, a driven conveyor upon which fish portions to be skinned are placed, a band saw having a portion disposed transversely above said conveyor to skin fish portions being conveyed past said transversely disposed portion by said conveyor, a plurality of driven and independently spring loaded hold-down belts having portions thereof in opposing relation to said conveyor above said transversely disposed portion of said band saw, and drive means for driving said hold-down belts so that said portions opposing said conveyor move in the same direction as said conveyor at slightly greater speed than said conveyor, the ratio of the speed of said hold-down belts to the speed of said conveyor being in the order of about 1.003 to 1.

3. In a fish skinning machine, a longitudinally extending driven conveyor upon which fish portions to be skinned are placed, a transversely extending band saw, said saw having a portion disposed slightly above said conveyor to skin fish portions being conveyed past said band saw by said conveyor, a plurality of driven and independently loaded longitudinally extending hold-down belts having portions thereof in opposed relation to said conveyor and disposed above said band saw portion to hold down fish portions being conveyed past said band saw, and drive means for driving said hold-down belts so that said portions of said belts opposing said conveyor move in the same direction as said conveyor at a slightly greater speed, the ratio of the speed of said hold-down belts to the speed of said conveyor being in the order of about 1.003 to 1.

4. In a fish skinning machine, a driven longitudinally extending endless conveyor belt upon which fish portions to be skinned are placed, an endless band saw, the top flight of which extends transversely of and slightly above said conveyor belt, the said saw being adapted to sever the skin from the meat of fish portions carried by said conveyor belt past said saw, a plurality of driven longitudinally extending and independently spring loaded endless hold-down belts having portions opposing said conveyor belt above the top flight of said band saw and adapted to hold said fish portions uniformly upon said conveyor belt, and drive means for driving said hold-down belts so that said portions of said belts opposing said conveyor belt move in the same direction as said conveyor belt at a slightly greater speed, the ratio of the speed of said hold-down belts to the speed of said conveyor belt being in the order of about 1.003 to 1.

5. In a fish skinning machine, a driven longitudinally extending endless conveyor belt upon which fish portions to be skinned are placed, an endless band saw, a portion of which extends transversely of and slightly above said conveyor belt the said saw being adapted to sever the skin from the meat of fish portions being conveyed thereto by said belt, a plurality of longitudinally extending endless hold-down belts disposed above said portion of the band saw being adapted to hold said fish portions uniformly upon said conveyor belt, a like plurality of idler pulleys bearing against the lower portion of each hold-down belt, means operatively associated with each idler pulley and yieldably biasing said hold-down belt toward said conveyor, and means for driving said conveyor belt and said hold-down belts so that the lower portions of said hold-down belts move in the same direction as said conveyor belt at slightly greater speed, the ratio of the speed of said hold-down belts to the speed of said conveyor belt being in the order of about 1.003 to 1.

References Cited in the file of this patent

UNITED STATES PATENTS

| | | |
|---|---|---|
| 614,392 | Jacobs | Nov. 15, 1898 |
| 1,591,347 | Van Allen | July 6, 1926 |
| 1,688,397 | Orndoff | Oct. 23, 1928 |
| 1,935,770 | Elliott | Nov. 21, 1933 |
| 2,173,336 | Lamere et al. | Sept. 19, 1939 |
| 2,566,021 | Fergnani | Aug. 28, 1951 |
| 2,601,292 | Hube | June 24, 1952 |
| 2,645,812 | Jensen | July 21, 1953 |

FOREIGN PATENTS

| | | |
|---|---|---|
| 965,649 | France | Feb. 22, 1950 |

(Corresponding to Jensen U. S. Patent No. 2,645,812)